United States Patent

[11] 3,614,759

[72] Inventors Edward H. Moore
Avon;
Milton A. Aron, Newington, both of Conn.
[21] Appl. No. 828,563
[22] Filed May 28, 1969
[45] Patented Oct. 19, 1971
[73] Assignee The Gems Company, Inc.
Farmington, Conn.

[54] INDICATING APPARATUS
10 Claims, 6 Drawing Figs.

[52] U.S. Cl. .................................................... 340/212,
340/381, 340/378 R, 317/101 R, 340/366
[51] Int. Cl. ....................................................... H02b 1/04,
H02b 9/00
[50] Field of Search........................................... 340/212,
244, 409, 381, 378 R, 379 R; 73/290, 304, 307,
313; 307/235, 251; 317/101 R, 101 CB

[56] References Cited
UNITED STATES PATENTS
3,335,414 8/1967 Meserow...................... 340/244
3,443,438 5/1969 Martin et al. ................. 340/409
3,519,849 7/1970 Tyler........................... 307/235

*Primary Examiner*—John W. Caldwell
*Assistant Examiner*—Robert J. Mooney
*Attorney*—McCormick, Paulding & Huber

ABSTRACT: An indicating apparatus for providing a visual linear output signal related to a measure variable in response to a voltage signal received from a sensor which measure the variable and provides an output voltage signal analogous thereto.

INVENTORS
EDWARD H. MOORE
MILTON A. ARON

BY McCormick, Paulding & Huber
ATTORNEYS

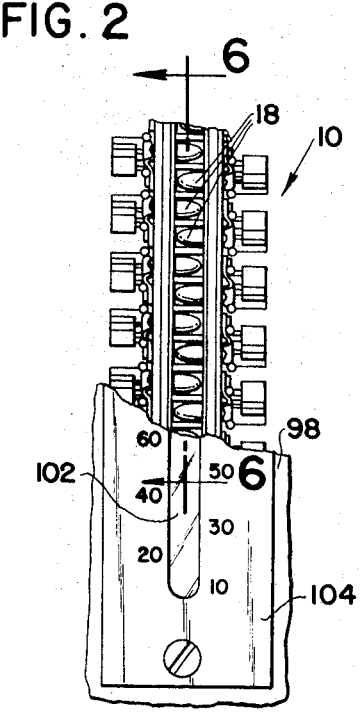
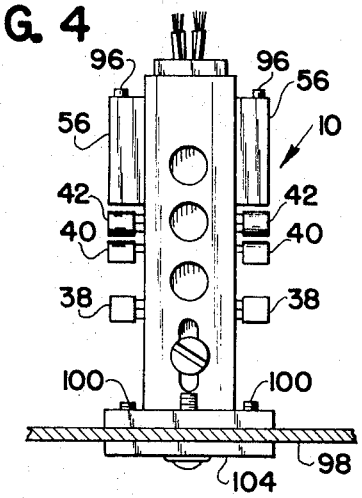
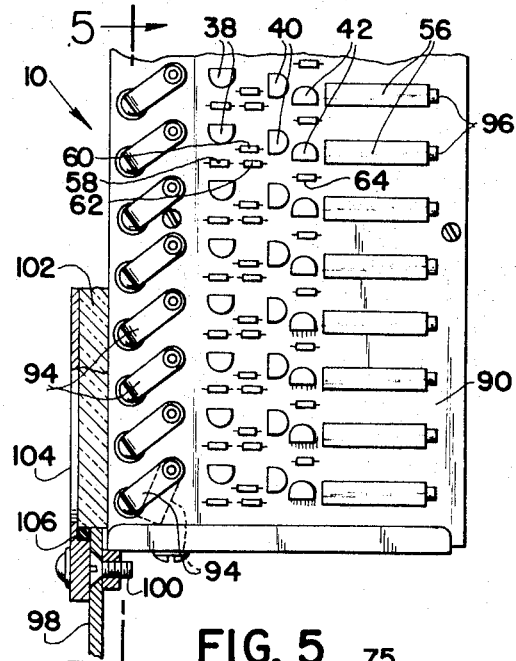
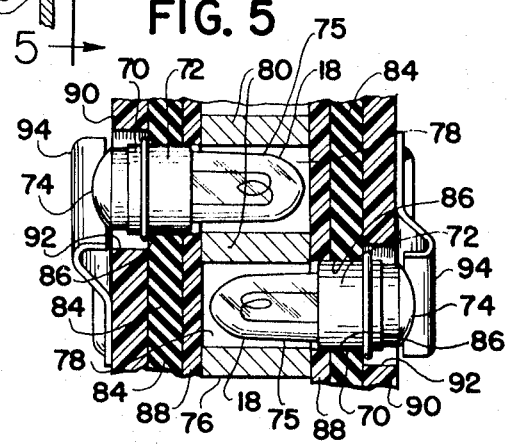
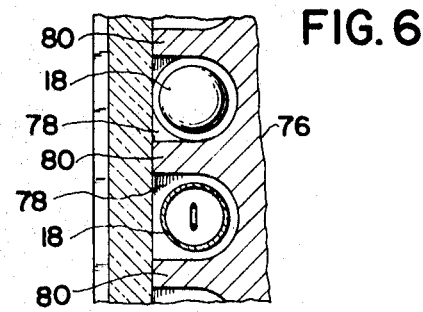

INDICATING APPARATUS

BACKGROUND OF THE INVENTION

This invention relates to improved indicating apparatus and deals more particularly with apparatus for providing continuous remote indication of a measured variable as, for example, the level of liquid in a tank or the like.

The general aim of the present invention is to provide an improved apparatus of the aforedescribed type for providing a visual graphic output signal analogous to a measured variable. A further aim of the invention is to provide a durable compact indicating apparatus which may be readily adjusted to generate a visual linear output signal related to a measured variable in response to a nonlinear signal received from a sensor which measures the variable.

The apparatus of the present invention may be used with any sensor or transmitter capable of producing an output voltage signal the value of which is related to a measured variable as, for example, pressure or temperature. It has proven particularly suitable, however, for providing continuous remote indication of the level of a liquid in a tank or the like. The apparatus may, for example, be readily adjusted to provide a graphic indication directly proportional to the quantity of liquid in an irregularly shaped tank where the measured variable is the level of liquid in the tank. The present apparatus is also particularly suited for applications where remote simultaneous monitoring of a plurality of measured variables is required as, for example, in a ship tank level-gauging system or the like.

SUMMARY OF THE INVENTION

In accordance with the present invention an indicating apparatus is provided for producing a visual output signal of a bar graph type in response to an output voltage signal received from a transmitter and analogous to the measured variable. The apparatus includes means for adjusting the visual output signal response relative to the output voltage signal received from the transmitter.

BRIEF DESCRIPTION OF THE DRAWINGS

FIG. 2 is a fragmentary front elevational view of a receiver made in accordance with the present invention.

FIG. 3 is a fragmentary side elevational view of the receiver of FIG. 2.

FIG. 4 is a plan view of the receiver of FIG. 2.

FIG. 5 is a somewhat enlarged fragmentary sectional view taken along the line 5—5 of FIG. 3.

FIG. 6 is a somewhat enlarged fragmentary sectional view taken along the line 6—6 of FIG. 2.

DETAILED DESCRIPTION OF PREFERRED EMBODIMENT

Figure 1:
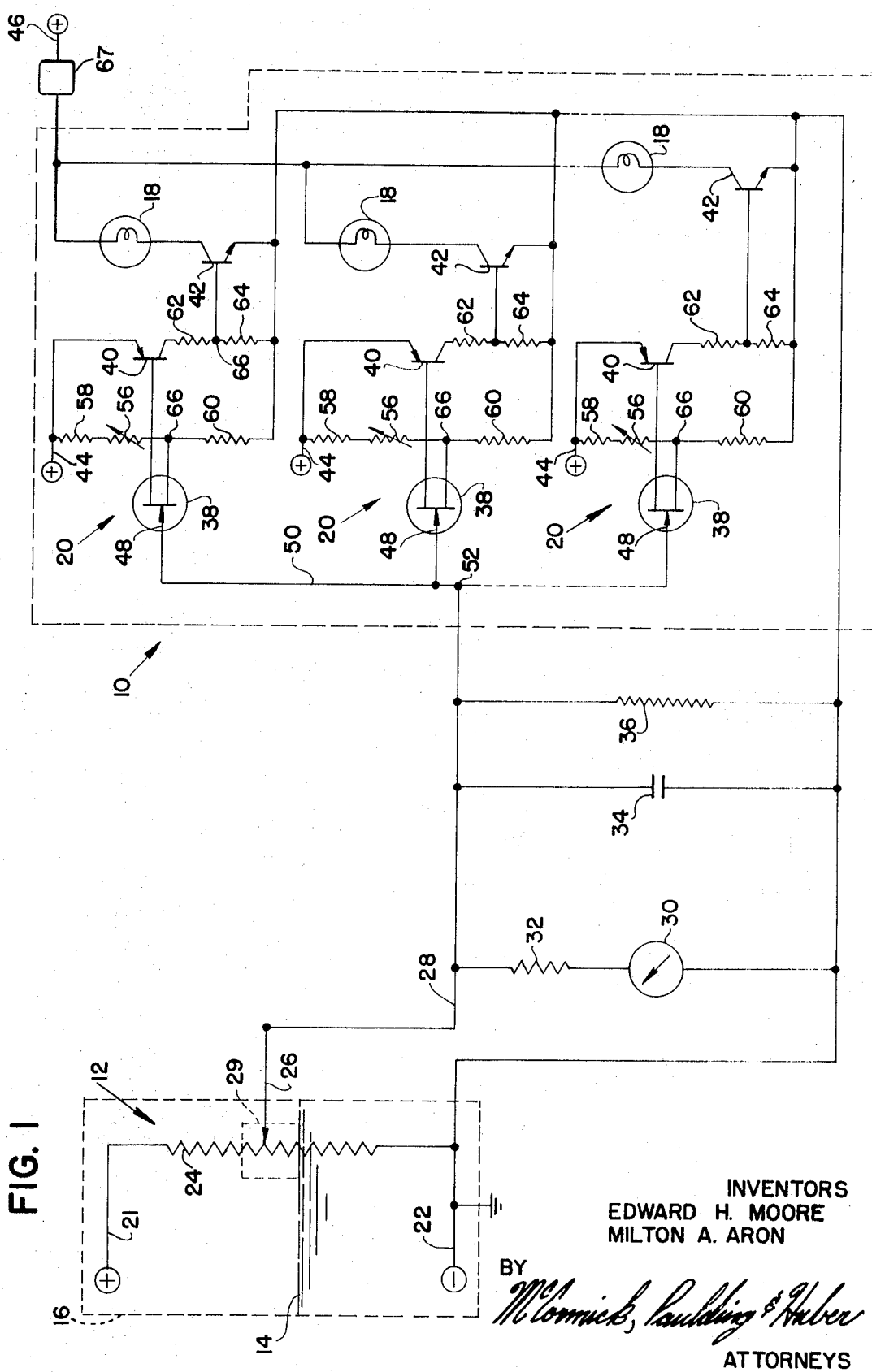
FIG. 1 is a circuit diagram of a liquid-level-indicating apparatus embodying the present invention.

Referring now to the drawings and particularly to FIG. 1, thereof, a liquid-level-indicating or tank-gauging system is shown which includes an indicating device or receiver embodying the present invention and designated generally by the numeral 10 and a transmitter, indicated generally at 12, electrically connected to the receiver for providing an output voltage signal related to the level of a liquid 14 contained in a tank 16. The receiver supports a plurality of lamps 18, 18, each lamp being connected to a respectively associated lamp circuit indicated generally at 20. Each lamp circuit 20 is arranged to respond to a predetermined output voltage signal from the transmitter 12 to switch an associated lamp 18 from a deenergized to an energized state when the output voltage signal exceeds such predetermined level and from an energized to a deenergized state when the output voltage signal is less than the predetermined level. The lamp circuits 20, 20 are each responsive to a different predetermined output voltage level. In the schematic circuit diagram of FIG. 1, three lamp circuits 20, 20 are shown, however, any number of lamp circuits may be provided, the number of circuits being determined by the desired indicating range or sensitivity of the apparatus. The lamps 18, 18 are arranged in longitudinal series and preferably operate in longitudinal sequence to provide a visual lineal output signal to indicate the level of the liquid 14 in the manner of a bar graph as will be hereinafter evident.

Further considering the FIG. 1, the transmitter 12 is schematically illustrated as a potentiometer connected to a DC output source by a line 21 and a ground line 22. The potentiometer 12 includes a resistor 24 and a wiper 26 connected to a signal voltage line 28 and arranged to move with a float 29 and relative to the resistor 24 in response to change in the level of the liquid 14. The apparatus also includes a slave meter 30 located near the tank 16 and connected in series with a resistor 32 between the ground line 22 and the signal voltage line 28 to provide indication of the approximate level of the liquid 14. A filter for the output signal voltage from the transmitter 12 is provided by a capacitor 34 and a resistor 36 connected in parallel across the lines 22 and 28. The lines 22 and 28 additionally connect the transmitter 12 to the receiver 10.

Considering now the electrical circuitry associated with the receiver 10, as shown in FIG. 1, a typical lamp circuit 20 includes a field-effect transistor 38, a PNP transistor 40, and an NPN transistor 42 which cooperate to switch an associated lamp 18 between an energized and deenergized state in response to changes in the signal voltage appearing on the line 28. Each lamp circuit is connected to two different voltage outputs of a DC power source by the lines 44 and 46. The field-effect transistor 38 has a control or gate terminal 48 connected to a line 50 which is, in turn, connected to the signal voltage line 28 at a junction 52. The source terminal of the field-effect transistor 38 is connected to the supply line 44 through a variable resistor 56 and a resistor 58. Another resistor 60 is connected between the source terminal and ground. The transistor 40 has its emitter terminal connected to the supply line 44 and its base terminal connected to the drain terminal of the field-effect transistor 38. The collector terminal of the transistor 40 is connected to ground through resistors 62 and 64. The base terminal of the transistor 42 is connected to the junction 66 between the resistors 62 and 64. The collector-emitter circuit of the transistor 42 forms a grounding circuit for the lamp 18 which is connected to the DC power supply line 46 through an adjustable voltage varying device 67 which controls the brightness of all of the lamps.

The source-drain circuit of the field-effect transistor 38 forms a control circuit for the biasing of the transistor 40, and the emitter-collector circuit of the latter transistor forms a control circuit for the biasing of the transistor 42. When the field-effect transistor 38 has its source drain circuit turned on or biased to a conducting state the transistors 40 and 42 will also be turned on or switched to a conducting state with respect to their respective emitter-collector circuits so that power will flow through the lamp 18.

It will be noted that the gate or control terminals 48, 48 of all of the field-effect transistors 38, 38 are connected in common at the junction 52 so as to simultaneously receive the signal voltage from the transmitter 12. Due to the high-impedance characteristics of the field-effect transistors no substantial voltage variation occurs at the junction 52 when the various lamps 18, 18 are switched between their energized and deenergized states. The variable resistors 56, 56 are adjusted so that each lamp circuit 20 responds to a different predetermined output voltage from the other of the lamp circuits. Preferably, the lamp circuits 20, 20 are adjusted by means of their resistors 56, 56, so that the lamps 18, 18 switch on and off in longitudinal sequence as the level of the liquid 14 increases or decreases to provide a direct graphic indication of the level of liquid in the tank 16. If desired, the receiver may be calibrated to indicate liquid quantity.

In some apparatus installations it may be desirable to provide a time delay device (not shown) in the electrical circuit so that the various lamp circuits 20, 20 are not immediately responsive to changes in transmitter output voltage. Such an arrangement is particularly desirable where the liquid to be indicated may be in motion, as aboard ship, and serves to stabilize the graphic output of the receiver.

Considering now the construction of the receiver 10 in more detail, and referring to FIGS. 2–6, the lamps 18, 18 used in practicing the invention are of conventional type, and each has a base 70 which includes a cylindrical portion or terminal 72 and another terminal 74 projecting from one end of the cylindrical portion and insulated therefrom. A translucent envelope 75 which contains a lamp filament extends axially from the other end of the cylindrical portion 72. Important features of the invention reside in the construction of the receiver and the matter in which the lamp and lamp circuit elements are supported and arranged relative thereto. As oriented in the drawings, the receiver generally comprises a plurality of strips of material arranged in adjacent side-by-side relation and includes a vertically elongated divider strip 76 preferably made from durable opaque material such as aluminum. A vertical series of forwardly opening lamp compartments 78, 78 are formed in the divider strip 76 and separated from one another by a plurality of generally horizontal partitions 80, 80. The lamps may be arranged to extend into the lamp compartments from either or both sides of the divider strip 76, but preferably as shown the receiver 10 includes two groups of opposing lamps 18, 18 arranged in alternate series. One group of lamps extend into one group of lamp compartments 78, 78 from one side of the divider strip and the other group of lamps extend into another respectively associated and alternately staggered group of compartments from the opposite side of the strip. This arrangement permits the lamps to be supported in the receiver 10 in relatively closely spaced relation to each other. An electrically conductive strip 84 is positioned adjacent each side of the divider strip 76 and extends vertically along at least the forward marginal portion thereof. The strips 84, 84 are preferably made from an elastomeric material such as electrically conductive rubber for electrical connection with the various lamp circuits and each strip has a vertical series of cylindrical openings 86, 86 formed therein. Each opening is aligned with a respectively associated lamp compartment 78 and has a diameter slightly smaller than the diameter of an associated lamp terminal 72 to snugly receive the latter terminal and establish electrical contact therewith. In the illustrated embodiment, a strip of insulating material 88 is positioned between each conductive strip 84 and an associated side of the divider 76.

The various circuit elements which comprise the lamp circuits 20, 20 are also preferably mounted, as shown, on the receiver 10. For this reason, an insulating strip or printed circuit board 90 respectively overlays each conductive strip 84. A plurality of circuit lines (not shown) imprinted on the inner surface of each circuit board 90 form portions of the lamp circuits 20, 20. A vertical series of cylindrical openings 92, 92 are formed in each circuit board 90, each opening 92 being in general coaxial alignment with an associated opening 86. Each opening 92 is somewhat larger than its associated opening 86 to permit a lamp 18 to pass freely therethrough.

A vertically spaced series of electrical contacts 94, 94 mounted on each circuit board 90 establish electrical contact with the lamp terminals 74, 74. Each contact 94 is electrically connected to an associated lamp circuit 20 and is pivotally mounted so that it may be swiveled to a position out of engagement with an associated lamp terminal 74 to facilitate lamp removal and replacement. In FIG. 3, the lowermost contact 94 is shown in broken lines as pivoted to such a position of disengagement.

Each of the transistors and resistors which comprise the elements of the various lamp circuits 20, 20 are mounted on the outer side of the associated circuit board 90 and are electrically connected to the imprinted circuits on the inner side of the board. It should be noted that each variable resistor 56 is provided with an adjustment screw 96 for varying the resistance thereof which is readily accessible from the rear of the receiver 10.

In service, the receiver 10 may be mounted on a panel such as indicated at 98 by fasteners 100, 100. A translucent plate 102, received in an opening in the panel 98, overlies the front surface of the divider strip 76, so that light from the lamps 18, 18 is visible therethrough, and is retained in assembly by a frame 104 and a gasket 106, as best shown in FIG. 3.

We claim:

1. An indicating apparatus for providing a visual lineal output signal related to a measured variable and for use with a transmitter which produces an output voltage signal the value of which is analogous to the measured variable, said apparatus comprising an elongated divider defining a longitudinal series of lamp compartments, each compartment being separated from the next successive compartment in said series by a generally transversely extending partition, an electrically conductive strip extending along one side of said divider and having a longitudinal series of openings therein, each of said openings aligned with a respective one of said compartments, a longitudinal series of lamps, each of said lamps having a translucent envelope received in a respective one of said compartments and including a base received in a respective one of said openings, said base including two spaced-apart terminal portions, one of said terminal portions electrically contacting said conductive strip, an insulating strip extending along said one side, and a longitudinal series of contacts mounted on said insulating strip, each of said contacts engaging the other of said terminal portions of a respective one of said lamps, and a plurality of lamp circuits, each of said lamp circuits being associated with one of said lamps and including a control terminal and means for switching said one lamp from a deenergized to an energized state when the voltage on said control terminal exceeds a predetermined level and from an energized to a deenergized state when the voltage on said control terminal is less than said predetermined level, each of said lamp circuits being responsive to a different predetermined voltage level than the other of said lamp circuits, said lamps being arranged to respond in longitudinal sequence to changes in said voltage level.

2. An indicating apparatus as set forth in claim 1 wherein each of said lamp circuits includes means for adjusting said predetermined voltage.

3. An indicating apparatus as set forth in claim 2 wherein said switching means includes a field-effect transistor, said control terminal comprises the gate terminal of said transistor and said adjusting means comprise means for varying the voltage on the source terminal of said field-effect transistor.

4. An indicating apparatus as set forth in claim 1 wherein said lamps include two groups of alternately arranged lamps, said series of compartments include two groups of alternately arranged compartments each of said openings along said one side aligned with a respective one of said compartments in one of said groups and receiving the base of an associated one of the lamps in one of said groups of lamps, another electrically conductive strip extending along the other side of said divider and having another longitudinal series of openings therein, each of said openings in said other series aligned with a respective one of said compartments in the other of said groups and receiving the base of an associated one of said lamps in the other of said groups, another insulating strip, extending along said other side and another longitudinal series of contacts mounted on said other insulating strip, each of said contacts in said other series engaging said other terminal portion of a respective one of said lamps in said other group.

5. An indicating apparatus as set forth in claim 1 wherein said insulating strip extends some distance rearwardly of said openings and the elements comprising each of said lamp circuits are mounted on said insulated strip.

6. An indicating apparatus as set forth in claim 5 wherein said insulated strip is a printed circuit board comprising a portion of each of said lamp circuits.

7. An indicating apparatus as set forth in claim 1 wherein said conductive strip comprises a piece of electrically conductive elastomeric material, and each of said openings before receiving the base of an associated one of said lamps is slightly smaller than said base of said one lamp.

8. An indicating apparatus as set forth in claim 1 wherein each of said compartments opens forwardly and including a translucent plate adjacent the forward portion of said divider and covering said forwardly opening compartments.

9. An indicating apparatus as set forth in claim 1 wherein each of said contacts is mounted on said insulating strip for pivotal movement relative thereto into and out of engagement with said other terminal portion of an associated one of said lamps, said one lamp being removable from said apparatus when the contact associated therewith is pivoted to a position out of engagement with said other terminal portion thereof.

10. In indicating apparatus for providing a visual lineal output signal related to a measured variable and for use with a transmitter which produces an output signal the value of which is analogous to the measured variable, said apparatus comprising an elongated divider defining a longitudinal series of forwardly opening lamp compartments, each compartment in said series being separated from the next successive compartment in said series by a generally transversely disposed partition, a strip of electrically conductive elastomeric material positioned generally adjacent and extending along one side of said divider and having a longitudinal series of openings therein, each of said openings aligned with a respective one of said compartments, a longitudinal series of lamps, each of said lamps having a translucent envelope received in a respective one of said compartments and including a base received in a respective one of said openings, said base including two terminal portions, one of said terminal portions electrically contacting said electrically conductive strip, a longitudinally extending insulating strip overlying an associated portion of said electrically conductive strip and extending rearwardly for some distance beyond said openings, a longitudinal series of contacts pivotally mounted on said insulating strip, each of said contacts being pivotally movable into and out of engagement with the other of said terminal portions of a respectively associated one of said lamps, said one lamp being removable from said apparatus when the contact associated therewith is pivoted to a position out of engagement with said other terminal portion thereof, a plurality of lamp circuits, each of said lamp circuits being associated with one of said lamps and including a plurality of circuit elements mounted on said insulating strip, each of said circuits having a portion thereof printed on said insulating strip and including a control terminal and means for switching said one lamp from a deenergized to an energized state when the voltage on said control terminal exceeds a predetermined level and from an energized to a deenergized state when the voltage on said control terminal is less that said predetermined level, each of said lamp circuits being responsive to a different predetermined voltage level than the other of said lamp circuits, said lamp circuits being arranged to respond in longitudinal sequence to changes in said voltage level, each of said lamp circuits including means for adjusting said predetermined voltage, and a translucent plate adjacent the forward portion of said divider and covering said forwardly opening compartments. circuits , each of said lamp circuits being associated with one of said lamps and including a plurality of circuit elements mounted on said insulating strip, each of said circuits having a portion thereof printed on said insulating strip and including a control terminal and means for switching said one lamp from a deenergized to an energzied state when the volatge on said control terminal exceeds a predetermined level and from an energized to a deenergized tate when the voltage on said control terminal, is less that said predetermined level, each of said lamp circuits being responsive to a different predetermined voltage level than the other of said lamp circuits, said lamp circuits being arranged to respond in longitudinal sequence to changes in said voltage level, each of said lamp circuits including means for adjusting said predetermined voltage, and a translucent plate adjacent the forward portion of said divider and ocvering said forwardly opening compartments.

PO-1050
(5/69)

UNITED STATES PATENT OFFICE
CERTIFICATE OF CORRECTION

Patent No. 3,614,759          Dated October 19, 1971

Inventor(s) Edward H. Moore, Milton A. Aron

It is certified that error appears in the above-identified patent and that said Letters Patent are hereby corrected as shown below:

Abstract, line 3, "measure" should read --measures--.
         Col. 3, line 16, "lamp" (first occurrence) should read --lamps--.
         Col. 3, line 18, "drawings" should read --drawing--.
         Col. 3, line 72, after "associated" insert --printed--.

Claim 10, delete lines 22-38 beginning and ending as follows: "circuits, each...forwardly opening compartments."

Signed and sealed this 27th day of June 1972.

(SEAL)
Attest:

EDWARD M. FLETCHER, JR.          ROBERT GOTTSCHALK
Attesting Officer          Commissioner of Patents